March 18, 1969     J. V. WATSON     3,433,033

KELLY DRIVE MEANS

Filed Sept. 7, 1966

INVENTOR
John V. Watson
BY
Wofford & Felsman
ATTORNEYS

United States Patent Office 3,433,033
Patented Mar. 18, 1969

3,433,033
KELLY DRIVE MEANS
John V. Watson, P.O. Box 11006,
Fort Worth, Tex. 76109
Filed Sept. 7, 1966, Ser. No. 577,787
U.S. Cl. 64—23.7
Int. Cl. F16d *3/06, 17/00;* E21b *3/04*
7 Claims

ABSTRACT OF THE DISCLOSURE

A kelly drive apparatus having rollers positioned to receive a kelly, with the rollers being supported on hollow bearing shafts partially filled with lubricant received from reservoirs on each side of each shaft.

---

Kelly drive apparatus utilized in the past includes a housing having a polygon shaped aperture extending therethrough for receiving a solid section or tubular shaft of polygon cross section. When the drive apparatus is rotated in a clockwise or counterclockwise direction, the solid section or tubular shaft, called a "kelly," is rotated about its longitudinal axis. The kelly is adapted to slide axially within the drive apparatus to enable the drill bit, which the kelly rotates, to be lowered, by the force of gravity, as the depth of the bore hole increases during drilling. Previous kelly drive apparatus includes a plurality of rollers which engage a kelly of square cross section to enable the kelly to slip more freely through the drive apparatus. Otherwise, the friction between the aperture of the drive apparatus and the kelly is sometimes sufficient to prevent the drill bit from being lowered freely into the bore hole during drilling.

One of the problems encountered when attempting to provide kelly drive apparatus with rotatable rollers which engage the kelly is that the bearings which support the rollers frequently cannot tolerate the detrimental conditions encountered during drilling. When antifriction bearings such as ball or roller bearings are used, for example, spalling of the bearing raceways and breakage of the balls or rollers frequently occurs. This causes significant maintenance problems and resulting delays in drilling operations.

Another problem with kelly drive apparatus is the difficulty in providing an adequate lubrication system which has simplicity and rugged reliability. It is undesirable, for example, that pressurized lubrication systems be utilized since a component failure in the system may lead to a pressure decrease requiring maintenance resulting in time delays. It is difficult, however, to provide a nonpressurized lubricating system which adequately lubricates the bearing surfaces associated with each roller during the adverse conditions common to earth boring operations. A further problem with kelly drive apparatus is that the nonuniform condition of the earth formations results in occasional partial seizures of drill bits during drilling which causes irregular motions of the kelly with resulting shock loadings being induced on the kelly drive apparatus. These shock loadings are extremely detrimental to the bearings supporting the rollers. I have originated a roller configuration which is an improvement over previously known roller configuration and minimizes more effectively the shock loadings induced on the kelly drive apparatus caused by the above described irregular rotational movements of the kelly.

It is, accordingly, the general object of my invention to provide an improved kelly drive apparatus for earth boring equipment.

Another object of my invention is to provide in a kelly drive apparatus a roller configuration which minimizes the shock loadings ordinarily encountered during earth boring operations.

Another object of my invention is to provide improved bearing means and lubrication systems for the rollers of kelly drive apparatus used in rotary well drilling equipment.

Another object of my invention is to provide an improved method for forming and assembling the bearing means and the rollers in kelly drive apparatus of rotary well drilling equipment.

These and other objects are effected by my invention as will be apparent from the following description taken in accordance with the accompanying drawing, forming a part of this application, in which.

Figure 1:
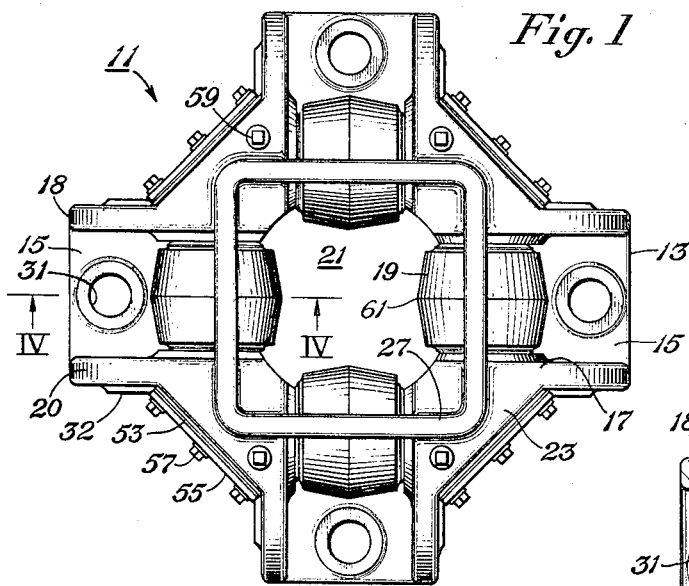
FIG. 1 is a plan view which illustrates kelly drive apparatus constructed in accordance with the principles of my invention.
Figure 2:
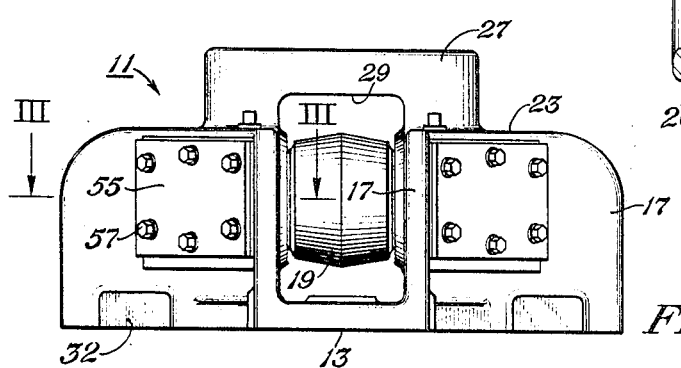
FIG. 2 is a side elevational view of the kelly drive apparatus of FIG. 1.

Referring initially to FIGS. 1 and 2, the numeral 11 designates a housing which is adapted to be carried by a rotary table (not shown) of conventional drilling equipment. In this instance the housing has four protrusions or wings 13 spaced at 90° intervals around its periphery and a floor 15 that supports a plurality of roller positioner means 17, each of which has two walls 18, 20 which are spaced from each other to define a vertically slotted portion for receiving a roller 19. As may be seen in FIG. 1, preferably four rollers 19 are carried by four roller positioner means 17 of the housing and arranged around a central opening 21 which receives a kelly of square cross-section (see for example FIG. 5).

Figure 3:
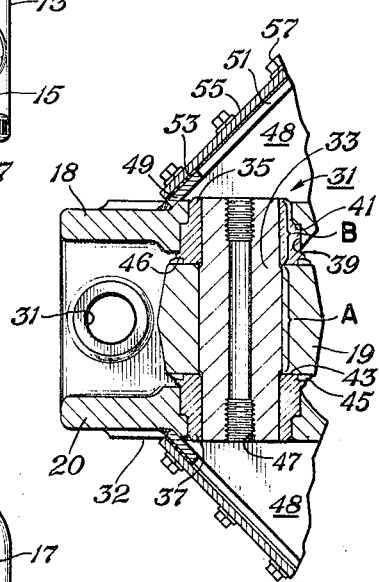
FIG. 3 is a fragmentary plan view, partially in section, showing a preferred bearing arrangement for the rollers of the kelly drive apparatus of FIGS. 1 and 2.

Extending upward from the top surfaces 23 of the roller positioner means 17 is another vertical wall 27, which is illustrated here as being square in plan view, having four slotted portions 29 (see FIG. 2) formed above each of the rollers 19. Also, the wings 13 have a plurality of apertures 31 extending through the floor 15 as shown in FIGS. 1 and 3 to serve as bolt holes to facilitate attachment to a rotary table. Bosses 32 are provided on the outer, drive surfaces of walls 18, 20 and are engaged by the rotary table (not shown) during rotation.

Referring now to FIG. 3, each of the rollers 19 is supported by bearing means 31 which includes a journal bearing shaft 33 and two spaced apart and coaxially aligned journal bearing bushings designated respectively by the numerals 35 and 37. Each of the journal bearing bushings is inserted in an aperture 39 in wall 18 or 20 which has a radially extending shoulder 41 which faces the roller 19 and engages a mating shoulder on the associated bushing to establish the axial position thereof. In addition, each of the bushings has a thrust shoulder 43 which engages a mating radially extending shoulder on the end of the roller.

Resilient seal rings 45 are positioned in an annular slot 46 in the thrust shoulder 43 of each journal bearing bushing to engage the end portion of the roller to prevent lubricant loss from interior regions of the housing.

Extending axially through the length of each journal bearing shaft 33 is an unobstructed lubricant passage 47 which connects the lubricant reservoirs 48 formed on each end of each bearing means 31. The reservoirs 48 encompass and totally or partially submerge the ends of bushings 35, 37 and each shaft 33 with lubricant. Preferably, the lubricant submerges one half of each bushing and shaft. Each of the reservoirs 48 is formed by the floor 15 of the housing; the walls 18 and 20 of the roller positioner means 17; the top surface 23 of the roller positioner means; and an obliquely extending wall 49 which has an aperture 51 extending therethrough (see FIG. 3 to enable convenient assembly of the journal bearing shaft 33 in the apparatus. Wall 49 is in effect a bulkhead which may be sealed by a suitable gasket 53 and a coverplate 55 which is retained against the associated bulkhead in this instance with a plurality of set screws 57. Therefore, the bearing means may be conveniently reached by removing the cover plates 55.

To introduce lubricant into lubricant reservoirs 48 a plurality of seal plugs 59 are received in the apertures provided in the top surfaces 23 of roller positioner means 17. Preferably, these seal plugs are arranged in a rectangular pattern to permit complete filling of all of the reservoirs 48 even when the kelly drive apparatus is not accurately positioned to be horizontal.

Figures 4, 5:
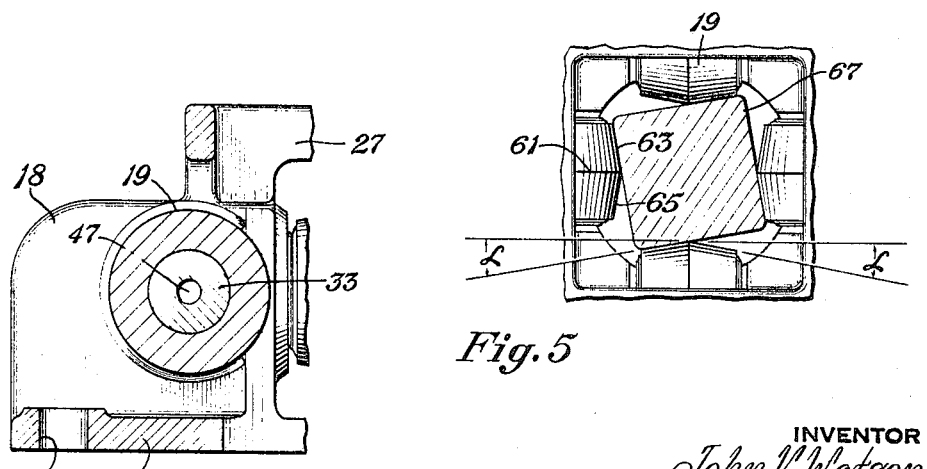
FIG. 4 is a cross sectional view as seen looking along the lines IV—IV of FIG. 3.
FIG. 5 is a schematic plan view of a portion of the kelly drive apparatus of FIG. 1 illustrating a preferred configuration of the rollers.

To eliminate the previously mentioned shock loading on the kelly drive apparatus, I have discovered that the rollers 19 must have an accurately formed configuration, which is illustrated schematically in FIG. 5. Extending from the midsection 61 and toward the end of each roller is a tapered region that converges with a conical angle $\alpha$ of preferably 12° toward the central axis of the roller. Angle $\alpha$ may vary between 10 to 15° since the manufacturing tolerances on the pieces necessitate that some range of angles be established. The conical surfaces 63 and 65 are of equal length and intersect preferably in a circular line at midsection 61, as is the case when the apparatus is adapted to receive a kelly 67 measuring 4 inches across the flats. For 6-inch kellys, however, I utilized a ½-inch diameter annular flat at midsection 61 to prevent the ends of the rollers from being too small and thereby eliminating space for provision of adequate seal rings 45 (see FIG. 3). If the rollers have a configuration of the above type, the shock loading on the kelly drive apparatus may be significantly decreased and upsetting or brinelling of the kelly reduced.

To assemble the bearing means 31 and rollers 19 in the kelly drive apparatus, the journal bearing bushings 35, 37 are secured by interference fit within the respective apertures of each set of walls 18, 20 until they are seated against the radially extending shoulders 41 thereof. It is preferable that there be about .003 inch interference between the cylindrical surfaces on the journal bearing bushings and the apertures in the vertical walls.

As shown in FIG. 3, each journal bearing shaft 33 has a central region A having a larger diameter than the end regions B, preferably by about .007 inch. After the journal bearing bushings 35, 37 have been inserted into their respective apertures in the walls 18, 20 of the roller positioner means 17, the associated roller 19 is placed between the walls and its aperture coaxially aligned with the apertures of walls 18, 20.

Each roller and its journal bearing bushings 35, 37 are then heated to expand the bushing and the roller, and simultaneously, the journal bearing shaft 33 is cooled so that region A may be inserted through the normally interferring apertures of the journal bearing bushings and the rollers. When the components have returned to ambient temperature, each roller 19 shrinks to an interference fit of about .003 inch around region A of the journal bearing shaft, thereby securing the journal bearing shaft and the roller to the roller positioner means 17. The diameters of regions B of the journal bearing shaft and the diameters of the aperture inside the journal bearing bushings should preferably have a clearance of .015 inch at ambient temperature. This bearing arrangement has proven particularly effective and rugged in earth drilling operations.

The kelly drive apparatus illustrated in the drawing and described above is secured in a conventional rotary table. A kelly is inserted in central opening 21 of the housing 11 and may thereafter be engaged by the rollers 19. Generally, the kelly drive apparatus is rotated in a clockwise direction by the rotary table (not shown) and thus the kelly and the rollers assume the relative positions illustrated in FIG. 5. The total clearance between the flats of the kelly and the rollers 19 is such that there can normally be a maximum of ⅛ inch clearance between these components. By utilizing an angle $\alpha$ in the range specified above, the rollers will engage the kelly across a relatively large area to prevent upsetting or brinelling of the kelly. Also, if the angles specified above are utilized, the rollers and the kelly will be engaged across a relatively large area when the direction of rotation of the kelly drive apparatus is reversed to the counter-clockwise direction. In addition, when the inconsistency of the earth formations or variation in the diameter of the hole is such that the drill bit tends to seize in the bore hole, the resulting radial movements of the drill bit and kelly may throw the kelly between engagement with the forward and rearward tapered surfaces of each roller, thereby generating detrimental shock loading. By utilizing my previously described angles, however, this shock loading may be minimized and the upsetting or brinelling of the kelly thereby minimized. Reduction of the shock loading is also beneficial to the bearing means which support the rollers and adds to their longevity.

The bearing means described with reference to FIG. 3 has proved particularly rugged even in the presence of shock loading, having a long life and relative freedom from maintenance problems. Such bearing means eliminate the need for the balls and rollers of antifriction bearings while simultaneously reducing the coefficient of friction between the mating bearing components with the assistance of an effective lubrication system.

My lubrication system, which consists of lubricant reservoirs at each end region of the bearing means associated with the rollers, with said reservoirs being connected by passages extending through the journal bearing shafts, is an essentially failsafe system by which I have obtained a high degree of reliability with an accompanying effectiveness which is often obtained only by using the less reliable force feed systems.

While I have shown my invention in only one of its forms, it should be apparent to those skilled in the art that it is not so limited but is susceptible to various modifications and changes without departing from the spirit thereof.

I claim:

1. A kelly drive apparatus comprising a housing having a central opening therethrough; rollers carried by said housing and spaced thereon to engage respective sides of a kelly of polygon cross section when positioned through the central opening of said housing; bearing means including a shaft and bushings on each end of a shaft secured to said housing for rotatably securing said rollers thereto; with said rollers having two tapered surfaces that converge toward opposite ends and the longitudinal axis thereof, each said tapered surface defining an angle in a range from 10 to 15° with the longitudinal axis of the associated roller; with said housing having a sealed interior region that defines a lubricant reservoir encompassing the end regions of said bearing means for submerging the ends of each shaft and its bushings under lubricant; an unobstructed lubricant passage extending axially through the length of each bearing means to connect the submerged ends of each shaft in the lubricant reservoirs; and lubricant introduction means spaced across the top surface of said housing for filling said reservoirs with lubricant and submerging the ends of said shafts and bushings.

2. The kelly drive apparatus defined by claim 1 wherein said angle is substantially 12°.

3. A kelly drive apparatus comprising a housing having a central opening therethrough; four rollers carried by said housing and spaced thereon to engage respective sides of a kelly of square cross section when positioned through the central opening of said housing; spaced apart roller positioner means secured to said housing and having a vertically slotted portion for receiving a roller; two spaced apart and coaxially aligned pairs of journal bearing bushings secured by interference fit in apertures in opposed walls of each roller positioner means; a journal bearing shaft inserted in an aperture in each roller and in the bushings of the associated positioner means; a liquid lubricant reservoir formed in said housing at the end region of each journal bearing shaft to communicate with each of said bushing and said journal bearing shaft; a lubricant passage extending axially through each journal bearing shaft; seal means between radial shoulders of said bushing and said rollers to prevent lubricant loss from said reservoirs.

4. A method of assembling the roller, journal bearing shaft, and journal bearing bushings within a roller position means of a kelly drive apparatus, said method comprising machining cylindrical end regions on the journal bearing shaft to have a diameter slightly smaller than the diameter of its central cylindrical region; machining a central axial aperture in each bushing to have a slightly smaller diameter than the central cylindrical region of the journal bearing shaft and a larger diameter than the cylindrical end regions of the journal bearing shaft; machining a cylindrical axial aperture in each roller to have a slightly smaller diameter than said central cylindrical region of said shaft; heating the roller to enlarge the aperture therein; and inserting a chilled journal bearing shaft through the heated and enlarged roller until the central cylindrical region of said shaft is axially aligned with the aperture of said roller; and cooling said roller to shrink said roller into interference fit with the central region of said shaft.

5. A kelly drive apparatus comprising a housing having a central opening therethrough; rollers carried by said housing and spaced thereon to engage respective sides of a kelly of polygon cross section when positioned through the central opening of said housing; bearing means including a shaft and bushings on each end of a shaft secured to said housing for rotatably securing said rollers thereto; with said rollers having two tapered surfaces that converge toward opposite ends and the longitudinal axis thereof, each said tapered surface defining an angle in a range from 10 to 15° with the longitudinal axis of the associated roller; with said housing having a sealed interior region that defines a lubricant reservoir encompassing the end regions of said bearing means for submerging the ends of each shaft and its bushings under lubricant; an unobstructed lubricant passage extending axially through the length of each bearing means to connect the submerged ends of each shaft in the lubricant reservoirs; and lubricant introduction means carried by said housing for filling said reservoirs with lubricant and submerging the ends of said shafts and bushings.

6. A kelly drive apparatus comprising a housing having a central opening therethrough; rollers carried by said housing and spaced thereon to engage respective sides of a kelly of polygon cross section when positioned through the central opening of said housing; bearing means including a shaft and bushings on each end of a shaft secured to said housing for rotatably securing said rollers thereto; with said rollers having two tapered surfaces that converge toward opposite ends and the longitudinal axis thereof; with said housing having a sealed interior region that defines a lubricant reservoir encompassing the end regions of said bearing means for submerging the ends of each shaft and its bushings under lubricant; an unobstructed lubricant passage extending axially through the length of each bearing means to connect the submerged ends of each shaft in the lubricant reservoirs; and lubricant introduction means carried by said housing for filling said reservoirs with lubricant and submerging the ends of said shafts and bushings.

7. A kelly drive apparatus comprising a housing having a central opening therethrough; rollers carried by said housing and spaced thereon to engage respective sides of a kelly of polygon cross section when positioned through the central opening of said housing; spaced apart roller positioner means secured to said housing and having a vertically slotted portion for receiving a roller; two spaced apart and coaxially aligned pairs of bearing bushings secured by interference fit in apertures in opposed walls of each roller positioner means; a bearing shaft inserted in an aperture in each roller and in the bushings of the associated positioner means; a liquid lubricant reservoir formed in said housing at the end region of each bearing shaft to communicate with each of said bushing and said bearing shaft; a lubricant passage extending axially through each bearing shaft; seal means between radial shoulders of said bushing and said rollers to prevent lubricant loss from said reservoirs.

References Cited
UNITED STATES PATENTS

| 2,140,659 | 12/1938 | Vock | 64—23.7 |
| 2,312,323 | 3/1943 | Derrick | 64—23.6 |
| 2,527,087 | 10/1950 | Vock | 64—23.7 |
| 2,970,458 | 2/1961 | McLerran | 64—23.7 |

HALL C. COE, *Primary Examiner.*

U.S. Cl. X.R.

175—195; 308—6; 321—45